United States Patent [19]

Miyakawa et al.

[11] Patent Number: 5,237,048
[45] Date of Patent: Aug. 17, 1993

[54] METHOD FOR PURIFYING POLYMER

[75] Inventors: Hisashi Miyakawa, Mobara; Takanobu Shinohara, Chiba; Tetsuo Maeda, Urayasu, all of Japan

[73] Assignee: Toyo Engineering Corporation, Chiba, Japan

[21] Appl. No.: 654,964

[22] Filed: Feb. 13, 1991

Related U.S. Application Data

[63] Continuation-in-part of Ser. No. 405,641, Sep. 11, 1989, abandoned.

[30] Foreign Application Priority Data

Sep. 22, 1988 [JP] Japan ................................ 63-238398

[51] Int. Cl.$^5$ ................................................. C08F 6/00
[52] U.S. Cl. .................................... 528/483; 528/481; 528/490; 528/497; 528/498; 528/503
[58] Field of Search ............... 528/483, 490, 497, 498, 528/503, 481

[56] References Cited

U.S. PATENT DOCUMENTS

| | | | |
|---|---|---|---|
| 3,683,511 | 8/1972 | Johnson et al. | 528/483 |
| 4,703,105 | 10/1987 | Allada | 528/483 |
| 4,990,595 | 2/1991 | Traechkner et al. | 528/483 |

FOREIGN PATENT DOCUMENTS

| | | | |
|---|---|---|---|
| 0052276 | 5/1982 | European Pat. Off. | |
| 0233661 | 8/1987 | European Pat. Off. | 528/483 |
| 967333 | 8/1964 | United Kingdom | |
| 1019145 | 2/1966 | United Kingdom | |
| 2223022 | 3/1990 | United Kingdom | |

*Primary Examiner*—Fred Teskin
*Attorney, Agent, or Firm*—Flynn, Thiel, Boutell & Tanis

[57] ABSTRACT

There is disclosed a method for purifying a polymer by extracting volatile materials contained in the molten polymer. According to the disclosure, a polymer having a very high degree of extraction of volatile materials can be obtained. The polymer obtained by the method of disclosure can meet the severe demands of the market that restricts the concentration of remaining volatile material impurities.

6 Claims, 1 Drawing Sheet

F I G. 1
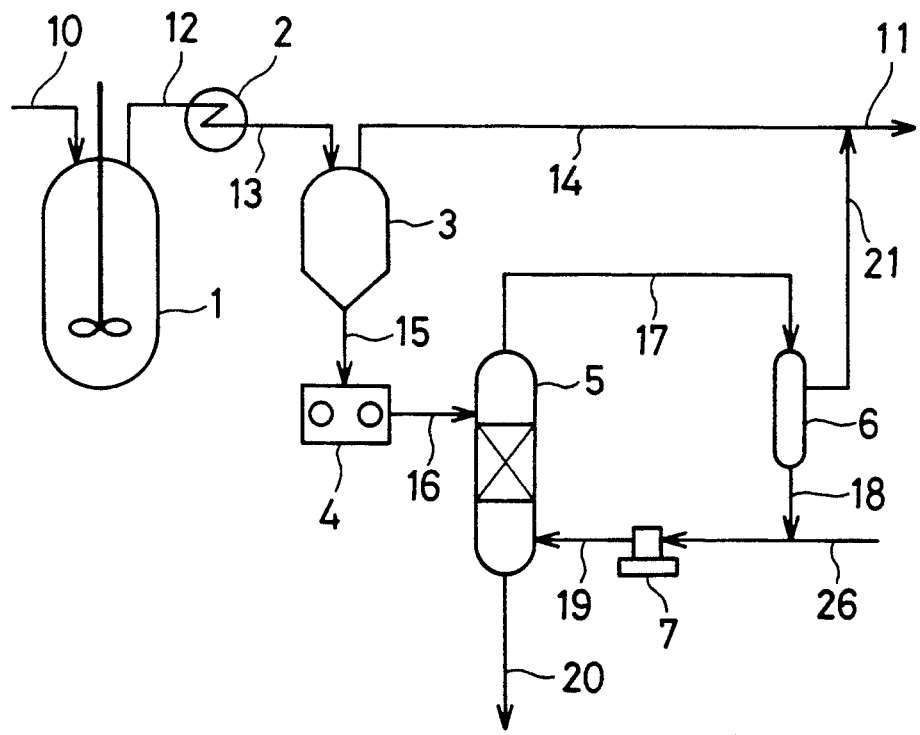

METHOD FOR PURIFYING POLYMER

This is a continuation-in-part application of U.S. patent application Ser. No. 07/405,641 filed on Sep. 11, 1989, now abandoned.

FIELD OF THE INVENTION

The present invention relates to a method for purifying a polymer, and more particularly, a method for extracting volatile materials contained in a molten polymer under high pressure, thereby removing the volatile components.

BACKGROUND OF THE INVENTION

As a method for removing volatile materials in a polymer, there are proposed, for example, in Japanese Patent Publication Nos. 29245/1986 and 52163/1986, methods wherein a molten thermoplastic resin is processed in a vent extruder, or in Japanese Patent Application (OPI) No. 166506/1984, a method wherein a polymeric liquid composition is continuously devolatilized by a volatilization separator directly connected to a vertical bubbling-type preheater and a vacuum tank. In recent years, a high-pressure extraction method that uses a supercritical fluid has been proposed, and Japanese Patent Publication No. 46972/1984 discloses, as a method for reducing oligomeric cyclic ethers contained in tetrahydrofuran polymers, alkylene oxide polymers, or tetrahydrofuran/alkylene oxide copolymers, a method wherein such a polymer is brought in contact with a gas that is in the supercritical state.

However, in the methods described in the above Japanese Patent Publication Nos. 29245/1986 and 52163/1986 and Japanese Patent Application (OPI) No. 166506/1984, the reduction in the concentration of volatile materials remaining in the processed polymer is approximately at the order of, at the most, 400 ppm, and these methods cannot meet the market demand where the concentration of volatile materials is required to be lower than 400 ppm. Further, although the method described in Japanese Patent Publication No. 46972/1984 is a method for extracting impurities from a polymer in the liquid state at ordinary temperatures under high pressure, thereby removing the impurities, the method cannot be applied to high-degree extraction wherein the concentration of impurities remaining in a polymer is required to be reduced to or below a certain concentration (thousands ppm).

SUMMARY OF THE INVENTION

Therefore, the first object of the present invention is to provide a method for effectively purifying a polymer in the molten state.

The second object of the present invention is to provide a method for purifying a polymer by extracting volatile materials from the polymer in the molten state, the degree of extraction being very high.

Other and further objects, features, and advantages of the invention will appear more fully from the following detailed description taken in conjunction with the accompanying drawing.

BRIEF DESCRIPTION OF THE DRAWING

FIG. 1 is a flow sheet showing an embodiment of the present invention.

DETAILED DESCRIPTION OF THE INVENTION

The inventors have studied intensively to overcome the above problems related to the purification of polymers, and have found that by bringing a polymer in the molten state in contact with an extractant, the removal of volatile materials can be performed effectively to reduce the concentration of volatile materials remaining in the polymer to or below approximately 100 ppm, leading to the completion of the invention.

That is, the present invention provides a method for purifying a polymer by treating the polymer with an extractant under high pressure, thereby removing volatile materials contained in the polymer, characterized in that the polymer is in the molten state when brought in contact with the extractant.

In carrying out the present method, preferable polymers are thermoplastic molding resins that will melt by heating but will be a solid at room temperature, for example, polyethylene, polypropylene, polystyrene, acrylonitrile/styrene copolymer, acrylonitrile/butadiene/styrene terpolymer, polyvinyl acetate, polyacrylate, polymethacrylate, polyvinyl chloride, polyvinylidene chloride, fluoroplastic, polyacrylonitrile, polyvinyl ethers, polyvinyl ketones, polyethers, thermoplastic polyesters, polyamides, dienetype plastics, and polyurethane plastics, and as heat resistant polymers polyxylylene, polycarbonate, polyphenylene oxide, and polysulfone.

Herein by "polymer in the molten state" is meant, for example, a bulk polymeric liquid composition of the above polymer, a melt obtained by heating a polymer in a powder or pellet form to be melted, or a mixture of a bulk polymeric liquid composition with a melt obtained by heating a polymer in the form of a powder or pellets to be melted. In the present invention, by using polymer in the molten state, the concentration of residual monomer can be remarkably reduced compared with the method using particle or granular forms of the polymer.

The extractant to be used in the present invention is suitably selected for the polymer in the molten state that will be subjected to extraction, and as specific examples, there can be mentioned (a) carbon dioxide, dinitrogen oxide, carbon disulfide, aliphatic hydrocarbons such as ethane, ethylene, propane, butane, pentane, and hexane, halogenated hydrocarbons, aromatic hydrocarbons such as benzene, toluene, and xylene, and alcohols such as methanol and ethanol, and (b) mixtures of two or more of these extractants. For reference, critical constants, etc. of the mentioned typical extractants are shown in Table 1.

TABLE 1

| Substance | Critical Constants | | |
|---|---|---|---|
| | Critical Temperature Tc (K.) | Critical Pressure Pc (atm) | Boiling Point b.p. (K.) |
| Carbon dioxide | 304.2 | 73.0 | 194.7* |
| Dinitrogen oxide | 309.8 | 71.7 | 184.2 |
| Carbon disulfide | 549.4 | 76.0 | 319.4 |
| Ethane | 305.4 | 48.3 | 184.6 |
| Ethylene | 282.8 | 50.5 | 169.4 |
| Propane | 369.7 | 42.0 | 231.1 |
| Butane | 425.6 | 37.5 | 273.0 |
| Pentane | 470.0 | 33.3 | 309.2 |
| Hexane | 507.9 | 29.9 | 341.9 |
| Benzene | 562.0 | 47.7 | 353.3 |
| Toluene | 593.1 | 41.6 | 383.7 |
| O-Xylene | 631.1 | 36.9 | 417.5 |

TABLE 1-continued

| | Critical Constants | | |
|---|---|---|---|
| Substance | Critical Temperature Tc (K.) | Critical Pressure Pc (atm) | Boiling Point b.p. (K.) |
| Methanol | 513.0 | 78.7 | 337.8 |
| Ethanol | 515.8 | 63.1 | 351.5 |

Note:
*sublimation

The extractant used in the present invention is in the liquid state or supercritical state and preferably is used in the supercritical state. When it is taken into consideration that the extractant is to be separated from the purified polymer, it is preferable to use an extractant that will be gaseous at normal temperatures and pressures or an extractant that has a boiling point of 150° C. or below at normal pressures, and most preferably, the extractant is used in the supercritical state. When the extractant is used in the supercritical state, although the pressure and temperature in the extractor may vary depending on the type of polymer to be purified and the type of extractant, generally, the pressure is usually 0.8 to 10 times of the critical pressure of the extractant; preferably, 20 to 500 kg/cm$^2$G and, more preferably, 100 to 350 kg/cm$^2$G. The temperature is usually 0.9 to 2.0 times of the critical temperature of extractant, preferably, 80° to 250° C. and, more preferably, 150° to 220° C. In this case, although the temperature in the extractor may be at or over the melting temperature of the polymer and below the critical temperature of the extractant, more preferably, the temperature in the extractor is at or over the critical temperature of the extractant.

In the present invention, the ratio of the molten polymer in the extractor to the extractant to be introduced into the extractor, in weight ratio, is usually in the range of 1:0.1 to 1:400, and preferably, 1:1 to 1:300and, more preferably, in the case of a continuous method in which counter-current mode of operation is usually employed, 1:1 to 1:20. In the case of batch method, i.e., an extractant, for example $CO_2$, passes through a polymer at a weight ratio of from 1:20 to 1:300. If the amount of extractant is too small, sufficient efficiency of extraction cannot be attained. If the amount of extractant is too large, the energy consumed for the compression of extractant or the like greatly increases due to the increased volume of extractant, with less enhancement of the extraction efficiency. In the present invention, preferably, a continuous method is employed.

Volatile materials that are subject to extraction in the present invention are volatile impurities contained in the molten polymer, such as unreacted monomers, solvents, and oligomers.

In carrying out the present invention, although the extractor to be used is suitably a packed tower type, tray tower type, spray tower type, or tank type, there is no particular restriction on the type of the extractor if the extractor enables good contact of the molten polymer with the extractant to be used. Multiple extractors may be arranged in parallel to effect the extraction continually, or they may be arranged in series, thereby flowing the polymer and the extractant, for example, in a countercurrent manner, to effect extraction continually.

Further, the melt of a polymer obtained by bulk polymerization or solution polymerization that has been roughly devolatilized (freed from the solvents), or the melt of a polymer obtained by emulsion polymerization or suspension polymerization that has been dehydrated (freed from the liquid medium) may be directly charged into the extraction tank, or it may be once solidified to pellets or the like and charged into the extraction tank directly or after melting the solids.

An embodiment of the invention will be described with reference to the drawing.

FIG. 1 is a flow diagram showing an embodiment of the invention which utilizes a packed-tower type extractor.

In FIG. 1, reference numeral 1 indicates a polymerization reactor provided with an agitator. A monomer to be polymerized is fed into the reactor 1 through a line 10 and polymerized therein continuously by a known method. The polymer product continuously drawn out of the reactor containing volatile impurities passes through a line 12 and heat exchanger 2 to elevate the temperature of the polymer to a temperature suitable for devolatilization and then fed to a devolatilizer 3 through a line 13 to evaporate the volatile material contained in the polymer by a conventional method. If the volatile matter in the polymer is low enough in concentration in the extracted product, the devolatilizer 3 may be omitted or bypassed.

Generally, the concentration of volatile impurity in the devolatilized polymer ranges from about 400 ppm to a few thousand ppm.

Again in FIG. 1, conventionally devolatilized polymer is fed, through a line 15, to a pump 4 for elevating the pressure of the molten polymer, and then through a line 16, to an extractor 5, whose pressure has been boosted to a pressure for extraction by a pressure booster 7.

The pressure booster 7 is a compressor when the extractant is in the gas phase or a pump when the extractant is in the liquid phase. Molten polymer is fed continuously, through a line 16, to the upper part of the extractor 5, which is kept at a certain pressure and a certain temperature, and flows down therein toward the bottom thereof and the extractant, fed continuously through a line 19 to the lower part of the extractor by the booster 7, flows up, counter currently and in contact with the flowing-down molten polymer, to the top of the extractor and is drawn out continuously therefrom through a line 17.

During contact with the extractant, volatile impurities are extracted from the molten polymer, which, after contact with the extractant, is taken out of the bottom of the extractor through a line 20 and fed to a subsequent process.

Through the line 17, extractant containing the extracted volatile impurities is fed to a separator 6, wherein the volatile impurities in the extractant are separated therefrom by a conventional method of applying a pressure reduction to and/or elevating the temperature of the supplied extractant, or adsorption of the volatile matter, for example.

The extractant thus purified in the separator 6 is recycled to the bottom of the extractor 5 through line 18, line 26 for make-up extractant, pressure booster 7 and line 19, with make-up extractant.

Volatile matter separated in the separator 6, which may accompany the extractant in the gaseous phase, is drawn out through a line 21, and, in this example, flows into a line 14 for the volatile matter from the devolatilizer 3 and the volatile material from both are fed to a process, not shown, through line 11 for the recovery of unpolymerized monomers.

The temperature of the extraction may be controlled by an additional heat exchanger for molten polymer provided in lines 15 or 16, and/or by controlling the temperature of the extractant fed into the extractor 5.

According to the present method, a polymer in the molten state can be purified effectively, and a polymer in the molten state can have volatile materials removed to a very high degree. The molded product of the polymer obtained by the present method can well meet the severe demand of the market that restricts the concentration of remaining volatile materials.

Now the present invention will be described in more detail with reference to Examples and Comparative Example.

EXAMPLE 1

20 g of polystyrene, in the form of pellets and having a concentration of volatile materials of 450 ppm, were charged into an extractor having a cylindrical space with an inner diameter of about 46 mm, and a height of about 87 mm (with an inner volume of 145 ml), and heated to 150° C. to melt the pellets, and then, as an extractant, carbon dioxide was continuously supplied from the bottom of the extractor, to increase gradually the pressure in the extractor. After, ultimately, the pressure in the extractor was brought to 245 kg/cm$^2$G and the temperature was brought to 150° C. and these conditions maintained, carbon dioxide was supplied continuously at a rate of 80 g/min, and, at the same time, carbon dioxide and the extracted impurities were released from the top of the extractor for over 1 hour. Then the supply of the carbon dioxide was stopped. The release was continued and, after the pressure in the extractor reached atmospheric pressure, the heating was stopped and, after the extractor was cooled to allow its temperature to reach 30° C. or below, the polystyrene was removed for analysis. The result of the analysis showed that the concentration of volatile materials decreased to 50 ppm.

COMPARATIVE EXAMPLE 1

This example was carried out using the same polystyrene in the form of pellets as in Example 1. That is, 20 g of polystyrene, in the form of pellets and having a concentration of volatile materials of 450 ppm, was charged into an extractor. Carbon dioxide was supplied from the bottom as an extractant and the pressure in the extractor was increased gradually. After, ultimately, the pressure in the extractor was brought to 245 kg/cm$^2$G and the temperature was brought to 50° C., and these conditions maintained, carbon dioxide was supplied continuously at a rate of 80 g/min and, at the same time, carbon dioxide and the extract were released from the top of the extractor for over 4 hours. Then the supply of the carbon dioxide and the heating were stopped. The release was continued and, after the pressure in the extractor reached atmospheric pressure and the temperature in the extractor reached 30° C. or below, the polystyrene was removed for analysis. The result of the analysis showed that the concentration of volatile materials was 410 ppm.

EXAMPLE 2

20 g of a polystyrene polymeric liquid in the molten state having a concentration of volatile materials of 2,500 ppm was charged into an extractor similar to that of Example 1. Carbon dioxide was supplied as an extractant and, thereafter, similarly to Example 1, extraction was effected except that the pressure and the temperature in the extractor were maintained at 245 kg/cm$^2$G and 220° C., respectively. After extraction, the temperature in the extractor was brought to 30° C. or below and the polystyrene was removed and analyzed. The result of the analysis showed that the concentration of volatile material was 90 ppm.

Though the devolatilized polymers were taken out of the extractor in solidified state in the above example, it may be practical to make the devolatilized molten polymer into pellet form in an industrial application by passing the molten polymer through an extruder for pelletization. In such a case it is often recommended to pass the molten polymer through a flash tank or the like to degas the polymer before it is extruded for a good operation of the extrusion or further processes. Alternatively, it may be practical to take out after the extraction the devolatilized molten polymer in a molten state for the next processing step.

EXAMPLE 3

Molten polystyrene having a temperature of 220° C. and a concentration of volatile materials of 2,500 ppm is pressurized to 245 kg/cm$^2$G by a gear pump and fed continuously at a rate of 1 kg/hr to the upper part of a packed tower type extractor maintained at 245 kg/cm$^2$G. The molten polystyrene flows down toward the bottom of the tower from a shower head provided at the upper part of the tower and put in contact countercurrently with carbon dioxide as the extractant. The height of the extractor (contact zone) is 5 meters.

Carbon dioxide is fed to the bottom of the extractor at a rate of 5 Nm$^3$/hr, which corresponds to 10 times by weight of the molten polystyrene fed as mentioned above.

Molten polystyrene and carbon dioxide are drawn out of the extractor at the bottom and top thereof, respectively, at the same rate at which they are supplied.

The concentration of volatile materials in the polystyrene discharged from the extractor tower as above is 40 ppm.

It will be understood that, in this continuous process, the reduction of the extractant medium and a less complicated process are attained effectively compared with the batch process in Examples 1 and 2.

COMPARATIVE EXAMPLE 2

Molten polystyrene identical to that of Example 3 is processed in the same way as in Example 3 except that the feed rate of carbon dioxide is 40 Nl/hr, which corresponds to 0.08 time by weight of the molten polystyrene.

The processed polystyrene had 1,700 ppm concentration of volatile materials.

Having described our invention as related to the discussed embodiment, it is our intention that the invention be not limited by any of the details of the description, unless otherwise specified, but rather be construed broadly within its spirit and scope as set out in the accompanying claims.

What we claim is:

1. In a method for purifying a polymer selected from the group consisting of polystyrene, acrylonitrile/styrene copolymer and acrylonitrile/butadiene/styrene terpolymer, the improvement comprising contacting the polymer in a molten state with carbon dioxide in its supercritical state as an extractant in a countercurrent flow and at a pressure of from 100–350 kg/cm$^2$G to remove the volatile materials contained in the polymer, the weight ratio of the polymer to the extractant being in a range of from 1:1 to 1:20.

2. The method as claimed in claim 1, wherein the polymer is treated with the extractant in the extractor at a temperature of from 150°–220° C.

3. The method as claimed in claim 1, wherein the molten polymer is selected from the group consisting of a bulk polymeric liquid composition containing the molten polymer, a melt obtained by heating a polymer in a powder or pellet form and mixtures thereof.

4. The method as claimed in claim 1, wherein the volatile materials are selected from among an unreacted monomer, a solvent and an oligomer.

5. The method as claimed in claim 1, wherein the extraction is carried out in plural extractors arranged in parallel.

6. The method as claimed in claim 1, wherein the extraction is carried out in plural extractors arranged in series.

* * * * *